March 25, 1958

C. K. COLE ET AL 2,827,778

RELEASABLE CLUTCH

Filed Sept. 9, 1955

INVENTOR.
CLAYTON K. COLE
OSCAR L. RADER
BY
ATTORNEY

March 25, 1958 C. K. COLE ET AL 2,827,778
RELEASABLE CLUTCH
Filed Sept. 9, 1955 2 Sheets-Sheet 2

INVENTOR.
CLAYTON K. COLE
OSCAR L. RADER
BY
ATTORNEY

United States Patent Office 2,827,778
Patented Mar. 25, 1958

2,827,778

RELEASABLE CLUTCH

Clayton K. Cole, Kalamazoo, and Oscar L. Rader, Kalamazoo Township, Kalamazoo County, Mich., assignors to Atlas Press Company, Kalamazoo, Mich., a corporation of Michigan Application September 9, 1955, Serial No. 533,268

3 Claims. (Cl. 64—29)

This invention relates to a safety clutch particularly suited for use on a power driven, reel-type lawnmower wherein said clutch is located at some point between the power source and the reel being driven thereby.

It frequently happens that rotation of the reel of a reel-type lawnmower is prevented as, for example, when stones, thick twigs or other articles lying on the ground are caught between a blade on the reel and the bed knife or other non-rotating part of the lawnmower. Unless provided for, such blocking of the rotation of the reel may cause breakage of parts of the lawnmower or it may cause stalling of the engine driving the reel. For obvious reasons, both of these alternatives are undesirable, and accordingly a suitable safety clutch must be provided between the engine and the reel.

A safety clutch suitable for this particular type of equipment should operate in such a fashion as to immediately inform the operator that the rotation of the reel is blocked. In addition, such a clutch should be simple so that it may be easily and inexpensively manufactured. Further, such a clutch must be easy to set so that the torque necessary to cause disengagement thereof may be set at the factory, using simple tools and following mass production techniques. The torque setting mechanism must not be easily accessible for alteration by an unskilled user of the lawnmower but must, nevertheless, be capable of adjustment by a skilled mechanic so that the clutch can be safely and satisfactorily adjusted to fit particular conditions of use.

Accordingly, it is an object of this invention to provide a safety clutch particularly, though not solely, adapted for use on a power driven, reel-type lawnmower.

It is a further object of this invention to provide a safety clutch, as aforesaid, which operates in such a manner as to immediately notify the operator of the lawnmower when it is disengaged.

It is a further object of this invention to provide a safety clutch, as aforesaid, which operates at a high noise level when disengaged.

It is a further object of this invention to provide a safety clutch which may be easily and rapidly set to disengage when a predetermined torque difference exists between the engageable parts thereof.

It is a further object of this invention to provide a safety clutch, as aforesaid, in which the torque difference necessary to disengage the clutch may be varied over a wide range.

It is a further object of this invention to provide a safety clutch, as aforesaid, which can be set to disengage when a predetermined torque difference exists between the engageable parts thereof, which setting cannot be accidentally changed or changed by an unskilled person.

It is a further object of this invention to provide a safety clutch which will be self-resetting for normal operation when the condition causing the disengagement is removed.

It is a further object of this invention to provide a safety clutch which will be substantially unaffected by the normally variable operating conditions, such as atmospheric temperature or humidity, or the type, amount or condition of lubrication.

It is a further object of this invention to provide a safety clutch which is capable of easy and rapid manufacture and assembly, effective in operation and capable of giving long service.

Other objects and advantages of this invention will become apparent to those acquainted with equipment of this type upon reading the following detailed description and inspecting the accompanying drawings, in which.

Figure 1:
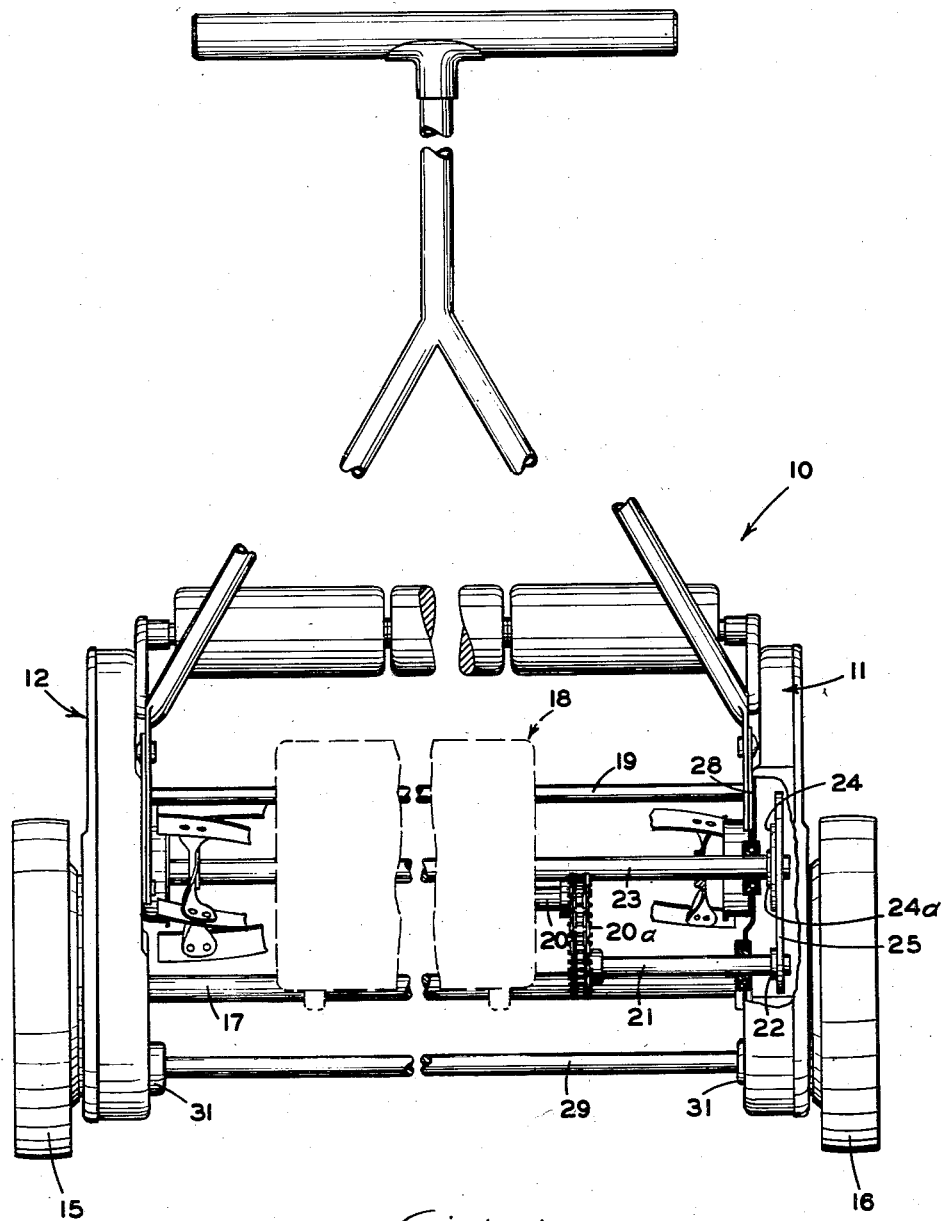
Figure 1 is a broken, top plan view of a reel-type lawnmower using the safety clutch of the present invention.

The frame of the mower 10 is comprised of a pair of frame end members or housings 11 and 12 which are held in substantially parallel relationship by means including the dead axle 17 and the brace rod 19, both of which extend between, and are non-rotatably secured to, said end members 11 and 12. The power unit 18, which may be a gasoline engine, is mounted upon the brace rod 19 and the axle 17 in any convenient, conventional manner. A first power shaft 20 extends from the power unit 18 to a sprocket and chain assembly 20a through and by which is driven a second power shaft 21. This shaft extends into the housing 11 where it supports a sprocket 22. The corresponding end of a reel shaft 23 also extends through the inner wall 28 of the housing 11 where it supports another sprocket 24. The sprockets 22 and 24 are interconnected by a chain 25. A safety release clutch 24a, which is the subject of the present invention, is provided in the hub of one of these sprockets, as the sprocket 24. The reel shaft extends into the housings 11 and 12 and is rotatably supported therein by bearings. A drive shaft 29 is rotatably supported near its opposite ends by bearings 31 and is drivingly connected to the ground engaging wheels 15 and 16.

It is to be understood that the description given thus far relates to one specific type of power driven lawnmower and is given for illustrative purposes only. It is apparent that the invention may be used on power driven, reel-type lawnmowers, which differ in some or many details from the mower described above, as well as upon other types of lawnmowers or other apparatus.

Figure 2:
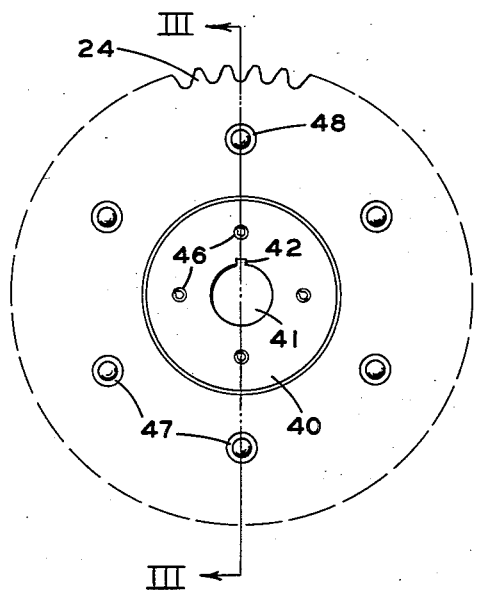
Figure 2 is a front elevation view of the safety clutch.
Figure 3:
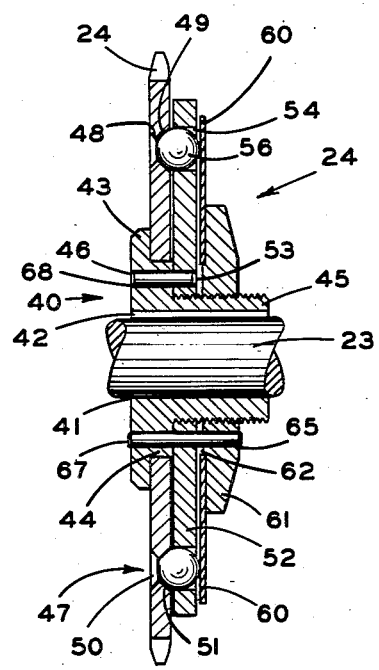
Figure 3 is a sectional view taken along the line III—III of Figure 2.

The safety clutch 24a includes a hub 40 (Figure 2) which has a central opening 41 therethrough and is provided with a keyway 42 for keying the hub to the reel shaft 23. The hub 40 includes a flange portion 43 (Figure 3) at one end thereof, a shoulder 44 and an externally threaded shank portion 45. A series of circumferentially spaced, longitudinally extending openings 46, here four, are provided through the flange portion 43 and the shoulder 44. The openings 46 are spaced radially outwardly relative to shank portion 45.

The sprocket 24 is mounted on shoulder 44 and is capable of rotation relative to the hub. The sprocket has a series of circumferentially spaced openings 47 formed therein, equidistant from the center thereof. The openings are provided with inwardly tapering side walls 48 and 49 which define a pair of aligned recesses 50 and 51 for the reception of the balls as hereinafter described in greater detail. The side walls 48 and 49 taper inwardly at an angle between 35 and 55 degrees with respect to the axis of openings 47, preferably at an angle of about 45 degrees.

A driver plate 52 is threaded onto the shank portion 45 of the hub and abuts against the shoulder 44. The driver plate is provided with a series of openings 53 therethrough aligned with and equal in number to openings 46. The driver plate 52 also has a series of circumferentially spaced apertures 54 located radially outwardly of openings 53 and aligned with, and equal in number to, openings 47. Balls 56, which may conveniently be ball bearings, are loosely received in the apertures and are of sufficient diameter to extend beyond either face of the driver plate. The balls in their clutch-engaged position seat in recesss 51, or in recess 50 if the sprocket is reversed.

Figure 4:
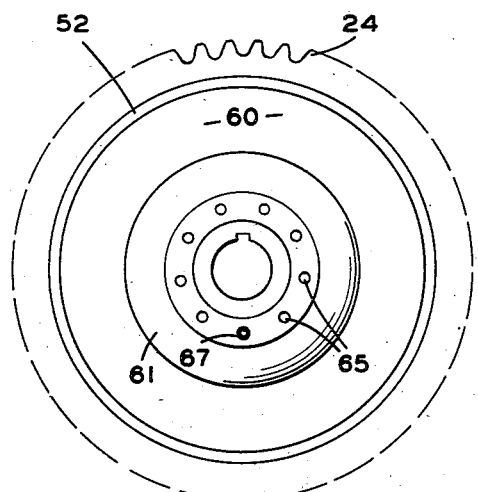
Figure 4 is a rear elevation view of the safety clutch.

A disc 60 (Figures 3 and 4), of stiff but resilient material, such as spring steel, surrounds the threaded shank 45 of the hub. A collar 61 is provided with a shoulder 62 which fits within the central opening of the disc and holds it in predetermined position about the hub. The collar is threaded onto the shank portion 45 and urges the disc 60 against the balls 56 and thereby urges the balls into recess 50 or 51.

The collar has a series of circumferentially spaced openings 65, here nine, therethrough, located the same distance from the longitudinal axis of the hub as openings 46 and 53. The number of openings 65 is preferably not equal to the number of openings 46 and 53 and preferably larger than the number of openings 46 and 53. As the collar 61 is rotated, each of the openings 65 will come into alignment with one of the series of aligned openings 46 and 53. A pin 67 is mounted in the aligned openings 46, 53 and 65 for the setting of the collar which corresponds to the desired torque rating of the clutch as explained in greater detail hereinbelow. It is apparent that, in the disclosed embodiment of the invention, for each complete rotation of the collar 61, there are thirty-six possible settings of the collar since each of the nine openings 65 in the collar can be aligned with any one of the four openings in the hub 40 and drive plate 52. This arrangement of openings therefore permits a precise adjustment of the torque rating of the clutch. It is apparent that greater or lesser numbers of openings 46, 53 and 65 can be provided if necessary or desirable.

Additional pins 68 extend through the other aligned openings 46 and 53 for insuring that the driver plate 52 stays in position on the hub, thereby lessening the force that would otherwise be exerted on pin 67.

*Assembly and operation*

In assembling the spring clutch 24a, the sprocket 24 is mounted on the shoulder 44 and the drive plate 52 is threaded onto shank portion 45 until it abuts against the shoulder. The steel balls 56 are placed in the apertures 54 and the collar 61 and the disc 60 are assembled. Thus, the collar 61 is threaded on the shank 45, using as a suitable tool, e. g., a torque wrench, capable of releasing when a predetermined resistance to further rotation is encountered. The collar urges the disc 60 against the balls 56 with said predetermined force, which in turn causes the balls to seat in the recesses in the sprocket. The pressure exerted by the collar 61 on the disc 60 is determined by the position of the collar on shank 45, which position is adjusted so that the disc 60 yields and the balls 56 move out of the recesses in the sprocket when rotation of the reel and reel shaft 23 is prevented. When the collar 61 is set so that the sprocket can move relative to the hub when the predetermined resistance to further rotation of the hub is encountered, pin 67 is fitted into and through the nearest alined openings 65, 53 and 46 and is fixed in place in suitable fashion, such as by peening the ends thereof. This construction prevents an unskilled person from changing the clutch release setting made by the factory, but permits a properly qualified mechanic to make adjustment in the clutch release setting should conditions of use require an adjustment thereof.

In normal operation of the mower, the balls 56 will be seated in the recesses in the sprocket 24 and the sprocket will drive plate 52 and thereby cause rotation of reel shaft 23. Should the reel shaft be prevented from rotating, the balls 56 will be forced out of the recesses against the urging of disc 60 by the force causing rotation of sprocket 24. The sprocket 24 will then rotate relative to plate 52 so shaft 23 will not be driven by the sprocket. The balls will be held in the plate 52 and will ride into and out of succeeding recesses in the sprocket 24 as the sprocket continues to rotate relative to plate 52. This action of the balls creates considerable noise and the operator is immediately informed that something is amiss.

Obviously, the taper of the side walls 48 and 49 is of considerable importance to the successful operation of the clutch since too steep a taper will prevent the balls from moving out of the recesses as easily as is desired while too shallow a taper will allow the balls to move out of the recesses too easily. Recesses 50 and 51 are provided in both sides of the sprocket so the sprocket can be reversed when the side walls of one of the recesses thereof are worn to an undesirable extent.

Although the above mentioned drawings and description refer to one particular, preferred embodiment of the invention, it is not our intention, implied or otherwise, to eliminate other variations or modifications of the invention unless specifically stated to the contrary in the hereinafter appended claims.

We claim:

1. A clutch construction for transmitting power from a source to a shaft, comprising in combination: a hub having a central opening therethrough, said hub including a flange at one end thereof, a shoulder adjacent said flange and an externally threaded shank portion adjacent said shoulder and extending to the other end of said hub; a sprocket surrounding said shoulder and abutting against said flange, said sprocket being capable of rotation with respect to said hub; means defining a series of recesses in the axial face of said sprocket facing the other end of said hub; a driver plate fixed to said hub adjacent said axial face of said sprocket; means defining a series of openings through said driver plate, said openings being alignable with said recesses; a series of balls, each of said balls positioned within one of said openings and being receivable into an aligned recess; a stiffly resilient disk surrounding said shank portion and bearing against said balls; and a collar threaded onto said threaded shank portion and bearing directly against said disk and supporting said disk against said balls.

2. A clutch construction for transmitting power from a source to a shaft, comprising in combination: a hub having a central opening therethrough and having an externally threaded shank portion; a sprocket surrounding said hub and being capable of rotation relative thereto, said sprocket having a series of spaced recesses formed in one axial face thereof; a driver plate secured to said hub and extending parallel to said sprocket, adjacent said one axial face thereof, said plate having a series of openings therethrough alignable with said recesses; a series of balls, each of said balls being positioned with one of said openings and being receivable into an aligned recess; a spring steel disk surrounding said hub and positioned adjacent said driver plate on the side thereof remote from said sprocket, said disk bearing against said balls; a collar, threaded onto said shank portion, contacting said disk and supporting said disk against said balls; and means for locking said collar in fixed position on said hub.

3. A safety clutch and hub assembly, comprising in combination: a hub having flange means formed on one end thereof; a sprocket mounted on said hub adjacent said flange means and being capable of rotation relative to said hub, said hub having a series of circumferentially spaced, longitudinally extending openings therethrough radially inwardly of said sprocket, and said sprocket having a series of circumferentially spaced recesses formed therein on the side thereof remote from said flange means; a driver plate secured to said hub adjacent said side of said sprocket, said driver plate having a series of apertures therethrough capable of being aligned with said recesses, and said driver plate having a series of circumferentially spaced, longitudinally extending openings therethrough aligned with said openings in said hub and lying radially inwardly of said apertures; balls mounted in said apertures and extending beyond either side of said driver plate, said balls being seatable in said recesses; a stiffly resilient plate encircling said hub adjacent the side of the driver plate remote from said sprocket, said resilient plate contacting said balls and resiliently urging said balls into said recesses; said hub having an externally threaded portion, an internally threaded collar mounted on said portion and contacting a surface of said resilient plate; a series of circumferentially spaced, longitudinally extending openings through said collar, said collar openings lying radially inwardly of the inner edge of said resilient plate, and being alignable with said openings in said hub and said driver plate; and pins extending through said aligned openings to lock said driver plate to said hub and to releasably fix said collar to said hub.

References Cited in the file of this patent

UNITED STATES PATENTS

| | | |
|---|---|---|
| 1,883,164 | Vassakos | Oct. 18, 1932 |
| 2,426,351 | Jeffrey | Aug. 26, 1947 |
| 2,571,669 | Boyce et al. | Oct. 16, 1951 |